United States Patent [19]

Bockholt

[11] Patent Number: 5,349,161
[45] Date of Patent: Sep. 20, 1994

[54] HEAT GUN WITH IMPROVED TEMPERATURE REGULATOR

[75] Inventor: Karl H. Bockholt, Delavan, Wis.

[73] Assignee: Master Appliance Corporation, Racine, Wis.

[21] Appl. No.: 954,649

[22] Filed: Sep. 30, 1992

[51] Int. Cl.⁵ .............................................. H05B 1/02
[52] U.S. Cl. ..................... 219/385; 219/501; 219/497; 219/240; 392/383; 392/385
[58] Field of Search ............... 219/211, 490, 497, 491, 219/494, 501, 499, 506, 385, 240, 386; 392/379, 384, 385, 383

[56] References Cited

U.S. PATENT DOCUMENTS

| | | | |
|---|---|---|---|
| 3,308,271 | 3/1967 | Hilbiber | 219/211 |
| 3,393,870 | 7/1968 | Jeffrey | 219/211 |
| 3,443,121 | 5/1969 | Weisbrod | 219/497 |
| 3,632,985 | 1/1972 | Bare et al. | 219/499 |
| 3,684,172 | 8/1972 | Evalds | 236/78 |
| 4,059,204 | 11/1977 | Duncan et al. | 222/146 HE |
| 4,348,583 | 9/1982 | Bube et al. | 219/497 |
| 4,582,057 | 4/1986 | Auth et al. | 219/229 |
| 4,636,617 | 1/1987 | Petersen et al. | 219/375 |
| 4,644,138 | 2/1987 | Walsh | 219/501 |
| 4,659,910 | 4/1987 | Harrison, Jr. et al. | 219/497 |
| 4,674,901 | 6/1987 | Lorenz | 374/169 |
| 4,685,616 | 8/1987 | Stein | 237/12 |
| 4,888,471 | 12/1989 | Thorax et al. | 219/501 |
| 4,889,483 | 12/1989 | Gentry | 432/49 |
| 4,962,299 | 10/1990 | Duborper et al. | 219/492 |
| 4,989,992 | 2/1991 | Piai | 374/141 |
| 5,043,560 | 8/1991 | Masreliez | 219/497 |

*Primary Examiner*—Mark H. Paschall
*Attorney, Agent, or Firm*—Jansson & Shupe, Ltd.

[57] ABSTRACT

The invention is an improvement in a gun-like device (often referred to as a "heat gun") emitting heated air at a variable temperature which can be selected by the user. The potentiometer used to set the desired air temperature is connected to an integrated circuit (rather than to an amplifier used as a variable gain element) and is used in such a way that the percentage of total potentiometer resistance in a portion of the circuit, rather than the actual potentiometer resistance value, regulates temperature. Low-cost, smaller potentiometers having a relatively "loose" tolerance can thereby be used. The new regulator also includes a novel circuit for shutting down the heat gun in the event of an open thermocouple and a novel circuit for essentially eliminating the undesirable subtractive effect of cold junction circuit board voltages on the hot junction voltage produced by the thermocouple.

13 Claims, 4 Drawing Sheets

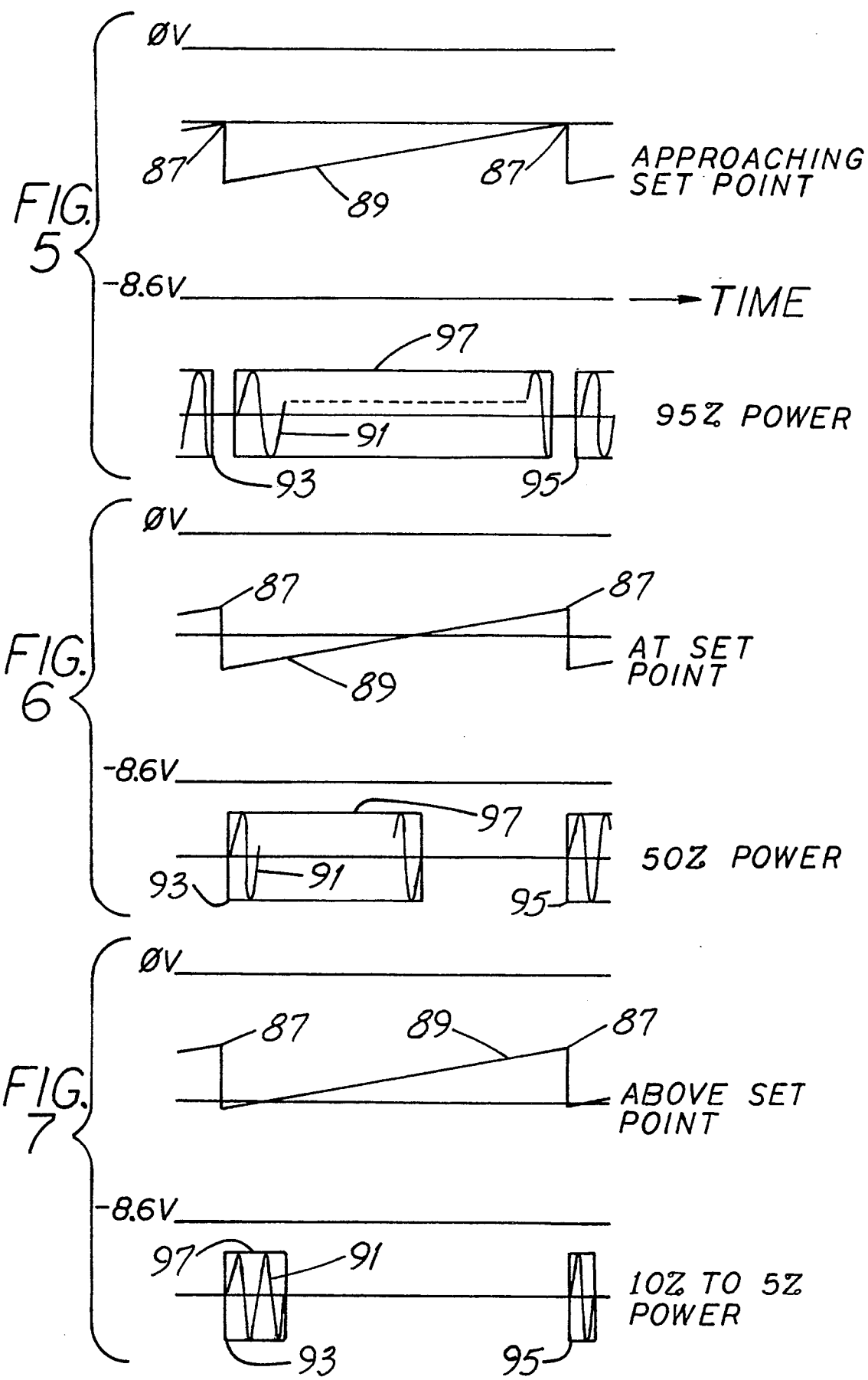

HEAT GUN WITH IMPROVED TEMPERATURE REGULATOR

FIELD OF THE INVENTION

This invention relates generally devices for producing heated air and, more particularly, to such devices having means for the user to select the air temperature.

BACKGROUND OF THE INVENTION

Heat guns, pistol-shaped devices emitting heated air from a "barrel," are in wide use by homeowners, contractors and the like for defrosting, forming plastics, stripping paint and many other uses. Such heat guns also resemble (in outward appearance and general function) common household hair dryers. However, hair dryers are relatively simple and devoid of temperature regulators.

Such heat guns are used for a variety of purposes, each of which may require (or at least prefer) a different air temperature. For example, paint stripping may require a very high air temperature while plastic forming, especially forming thin sheets or "small-mass" pieces will likely require a more moderate temperature. And, sometimes, the gun is employed solely for its forced air stream with no need for the air to be heated.

Certain known temperature regulators use low-power circuitry having solid state amplifiers. In prior art heat guns, the voltage change of the temperature-sensing thermocouple is amplified using an amplifier with a variable gain. The amplified thermocouple voltage is applied to a comparator which compares such voltage with a fixed threshold or reference voltage and switches a thyristor accordingly.

U.S. Pat. No. 3,443,121 (Weisbrod) depicts a temperature control system uses a variable resistor to adjust gain. And the sawtooth generator circuit also includes an adjustable resistor. Therefore, production versions of the Weisbrod circuit would apparently require adjustable potentiometers, the ohmic values of which are closely matched. There is no mention of protection against an open thermocouple.

The system shown in U.S. Pat. No. 3,684,172 (Evalds) uses a variable resistor to select a "set point" temperature by adjusting gain on an amplifier. The system depicted in the Evalds patent also has a temperature compensating circuit which uses a thermistor as part of a circuit to "neutralize" the effect of cold junction voltages. Protection against an open thermocouple is not indicated.

Known temperature regulators of the foregoing types share certain disadvantages. A major disadvantage of those using rheostatically-adjusted, variable gain amplifiers (as depicted in the Weisbrod and Evalds patents) is that the ohmic values of the rheostats or potentiometers used in production heat guns must have closely similar values, e.g., within plus or minus 5% or so.

This is so since any deviations from the resistance "design value" will be amplified and there will be relatively large temperature "offsets." To put it another way, a particular potentiometer setting for each of a group of production heat guns will result in large variations in output air temperatures for such guns. The products will not perform uniformly one to the other. Potentiometers with the required parameters are readily available, but they are usually of large size and of high cost.

Another disadvantage of certain types of temperature regulators used in heat guns and other applications involves a type of control aptly known as "on-off" control. Some background information will be helpful in understanding some of the problems associated with on-off control.

Certain types of control systems are known as "closed loop" systems. In such systems, some "action" occurs, e.g., application of electrical power, and this causes a reaction, e.g., increase in the temperature of the air from a heat gun. The reaction (the rise in air temperature) is sensed and causes an adjustment to the action, e.g., switching the power off. Each such system also has a certain "time constant." This means that the action and the reaction do not occur simultaneously—there is a time lapse between them.

In a heat gun, the time constant is the time required to detect a change in the input power by a change in the output air temperature. For example, when electrical power is applied to the resistance heater of a heat gun, the heater wire gets hot and heats the ceramic core upon which it is wound. Of course, the air passing through the core is also heated. To put it another way, the time constant is the time required to increase the temperature of the heater wire, the ceramic core, the air stream being heated by the core and, finally, a thermocouple-type temperature sensor, the latter by an amount detectable by the regulator circuit.

The temperature sensor produces a small voltage, the value of which is a function of the sensed temperature. Such voltage is sometimes referred to as the Seebeck voltage after its discoverer. The sensor is heated by the air and in a conventional heat gun, the small sensor output voltage is amplified and applied to a comparator which, in turn, causes a switch to turn the power on or off.

Typically, the power is turned off only when the desired air temperature (often referred to as the "set point" temperature) is attained. But even after the power is turned off, a considerable amount of energy in the form of heat is stored in the resistance wire and in the ceramic core. This energy will continue to heat the air to a temperature higher than the set point temperature.

Conversely, as the air cools and its temperature declines below the set point temperature, electric power is again applied to the resistance heater. However, it will take some time to bring both the resistance wire and the ceramic core to a temperature sufficiently high to raise the air temperature back up to the set point temperature. Stated another way, with on-off control, there are relatively large temperature excursions above and below the set point. Such a system is said to exhibit poor regulation.

To combat these undesirable temperature excursions, a technique called proportional voltage control is often employed in more advanced temperature regulators. In proportional voltage control, the amplified sensor voltage is modulated by a second voltage which rises and falls over a period of time. Such second voltage displays essentially the shape of a sawtooth, the amplitude and period of which are designed to complement the controlled systems time constant. Conventional proportional voltage control systems employ comparators which compare the modulated sensor voltage with a threshold or reference voltage. The "compared" difference between such voltages affects the length of time that electrical power is applied to the heating element.

When this modulated sensor voltage is compared to the threshold voltage, the electric current will be applied to the resistance heating element for shorter or longer periods of time, depending, respectively, on whether the sensed (i.e., actual) air temperature is close to or more disparate from the set point temperature. Any significant overshoot of the set point temperature is usually avoided.

A drawback of conventional proportional temperature controls is that the amplitude (value) and period (time required for one cycle) of the modulating sawtooth voltage can be optimally matched to the system time constant only for a relatively small temperature span. Therefore, it is not ideally suited for the output of a heat gun requiring a temperature span from ambient to more than 1000° F.

Another concern in the design of a temperature regulator is the possibility of a sensor failure. In some designs, such a failure functions to turn the electrical power applied to the heating element "full on." The heating element is therefore likely to overheat since that component which "tells" the regulator that a desired air temperature has been reached, the sensor, is inoperative. Although protection against a failed sensor is readily achieved, conventional regulators use several parts to accomplish this result. The cost of and space required by the regulator are therefore unnecessarily increased.

Yet another problem in conventional temperature regulators involves the "cold" connections of conductors of dissimilar metals in the regulator circuit. Such connections exhibit what is called a "cold junction" voltage. These cold junction voltages diminish or subtract from the thermocouple hot sensor voltage, thereby reducing the already-small value of the latter. As a consequence, accurate temperature control becomes more difficult since the regulator must "work with" a signal voltage of unnecessarily-reduced value.

OBJECTS OF THE INVENTION

It is an object of the invention to provide a heat gun with an improved temperature regulator overcoming some of the problems and shortcomings of the prior art.

Another object of the invention is to provide an improved temperature regulator with proportional control.

Another object of the invention is to provide an improved regulator in which the air temperature "set point" is relatively insensitive to the absolute value of the temperature-regulating potentiometer.

Yet another object of the invention is to provide a heat gun having an improved regulator permitting use of a "loose tolerance" potentiometer.

Still another object of the invention is to provide a heat gun with an improved regulator having dramatically simplified means to maintain the air-heating heater assembly in an "off" state in event of an open sensor thermocouple.

Another object of the invention is to provide an improved regulator having a compensator which avoids diminishing the hot junction voltage of the thermocouple. How these and other objects are accomplished will become apparent from the following descriptions and the drawing.

SUMMARY OF THE INVENTION

The invention is an improvement in a gun-like device emitting heated air at a variable temperature. Such devices, usually referred to as "heat guns," have a temperature regulator used to control the electrically powered gun heater assembly. Control is such that the actual temperature of air being emitted by the gun is generally equal to a desired air temperature set by the user.

Temperature regulator circuits of the type used in heat guns are known as closed-loop or "feedback" circuits in that they continually compare a signal representing a desired air temperature with a signal "fed back" to the circuit and representing the actual air temperature. Conventional temperature regulators may include (a) an amplifier, (b) a thyristor for controlling electrical power to a heater assembly and (c) a variable resistor for selecting air temperature.

The improved regulator includes an integrated circuit emitting gating pulses controlling the thyristor and the amplifier is a constant gain reference amplifier rather than a variable gain amplifier as used in earlier devices. The variable resistor is a potentiometer which has a pair of fixed terminals, one each connected to a neutral bus and a negative voltage bus. The buses have a substantially constant voltage between them and in the exemplary embodiment, such voltage is about $-8.6$ volts.

The potentiometer, used to select the temperature "set point," also has an adjustment terminal, i.e., that terminal brought out from the sliding connection in the potentiometer housing. Such terminal is connected to a voltage-modulated pin of the integrated circuit. When so arranged, the potentiometer-derived voltage applied to the voltage-modulated pin is a function of the percentage of the potentiometer resistance connected between the voltage bus and the pin.

This is an important commercial advantage since, within reasonable limits and unlike earlier heat guns, the actual potentiometer resistive value is of little consequence in regulating air temperature. Because of this unique feature, new regulators work well with smaller, low-cost potentiometers having a manufacturing tolerance of, say, plus or minus 20% rather than plus or minus 5%.

The new regulator includes a "generator" circuit providing a sawtooth voltage. The generator is also connected to the voltage-modulated pin and the net voltage at the pin is the algebraic sum of the sawtooth voltage and the potentiometer-derived voltage.

In the exemplary regulator, the integrated circuit includes a reference pin at a reference voltage provided by a reference amplifier. Such reference voltage represents the actual temperature of the air being emitted by the gun and of course, the reference voltage varies with actual air temperature. The integrated circuit emits gating pulses when the net voltage at the modulated pin is negative with respect to the reference voltage.

Air emitted by the heat gun is heated by an air heating assembly, a ceramic tube-like structure of a known type having electrical wires not unlike those of a common household toaster. When electrical power is applied to the wires, they become hot and heat the air passing through the assembly. Such assembly has a time constant as described above.

In the highly preferred embodiment, the sawtooth voltage has a "period" (the time required to complete one "cycle" of the sawtooth) which is selected in view of the time constant. Such period is in the range of 200 milliseconds to 400 milliseconds and, more particularly, in the range of about 300 milliseconds to about 350 milliseconds.

Many types of heat guns use a thermocouple sensor to provide a signal representing actual air temperature. A thermocouple provides a voltage across its terminals and the magnitude of this voltage is temperature-dependent. In earlier heat guns (and as described above), a broken thermocouple could undesirably cause the heat gun to turn "full on."

The improved regulator also includes novel features protecting against an open thermocouple. More specifically, the regulator has first and second subcircuits and a sensing resistor common to both subcircuits. However, the thermocouple is connected only to one subcircuit.

Each subcircuit has a current flowing through it and the resistor has both currents flowing through it. The currents flow in opposite directions through the resistor and are of substantially equal value. Therefore, the "net" current through the sensing resistor is essentially zero and, therefore, so is the voltage drop across the resistor. When the regulator is so arranged, an open thermocouple produces a current imbalance in the resistor and the effect of such imbalance is described below.

The regulator also has an input amplifier providing a signal representing air temperature and the sensing resistor is connected to such input amplifier. A current imbalance resulting from a broken thermocouple produces a voltage across the sensing resistor and the input amplifier thereby provides a "default" signal representing a high air temperature.

To the regulator circuit, this signal from the input amplifier "looks like" a signal which would occur if the actual air temperature was very high. Therefore, such signal prevents the integrated circuit from emitting gating pulses. Without gate pulses, the thyristor cannot conduct and no electrical power can be applied to the heater assembly. Therefore, the heater assembly is maintained in an "off" state.

And the new regulator is improved in yet another way. The temperature-dependent voltage or "hot junction" voltage produced by the thermocouple has a relatively small value. The connections of the thermocouple lead wires to the "printed" copper wire-like strips on a printed circuit board produce a cold junction voltage.

The regulator includes a diode which greatly reduces the undesirable subtractive effect of the cold junction voltage. The diode provides a temperature-dependent voltage of its own and such diode is connected in a way that it negates the cold junction voltage.

In a highly preferred embodiment, the diode (mounted on the printed circuit board) and the thermocouple electrical connections are maintained at substantially the same temperature. Such temperature maintenance is by mounting the printed circuit board in the heat gun housing at a location nominally at ambient air temperature and well away from the hot air stream.

Further details regarding the invention are set forth in the drawing and the following detailed description.

BRIEF DESCRIPTION OF THE DRAWING

FIGS. 5, 6 and 7 are graphic representations of the function of a modulating sawtooth voltage and the resulting way electrical power is proportionally applied to the heating element of a heat gun.

DETAILED DESCRIPTION OF PREFERRED EMBODIMENTS

Figure 1:
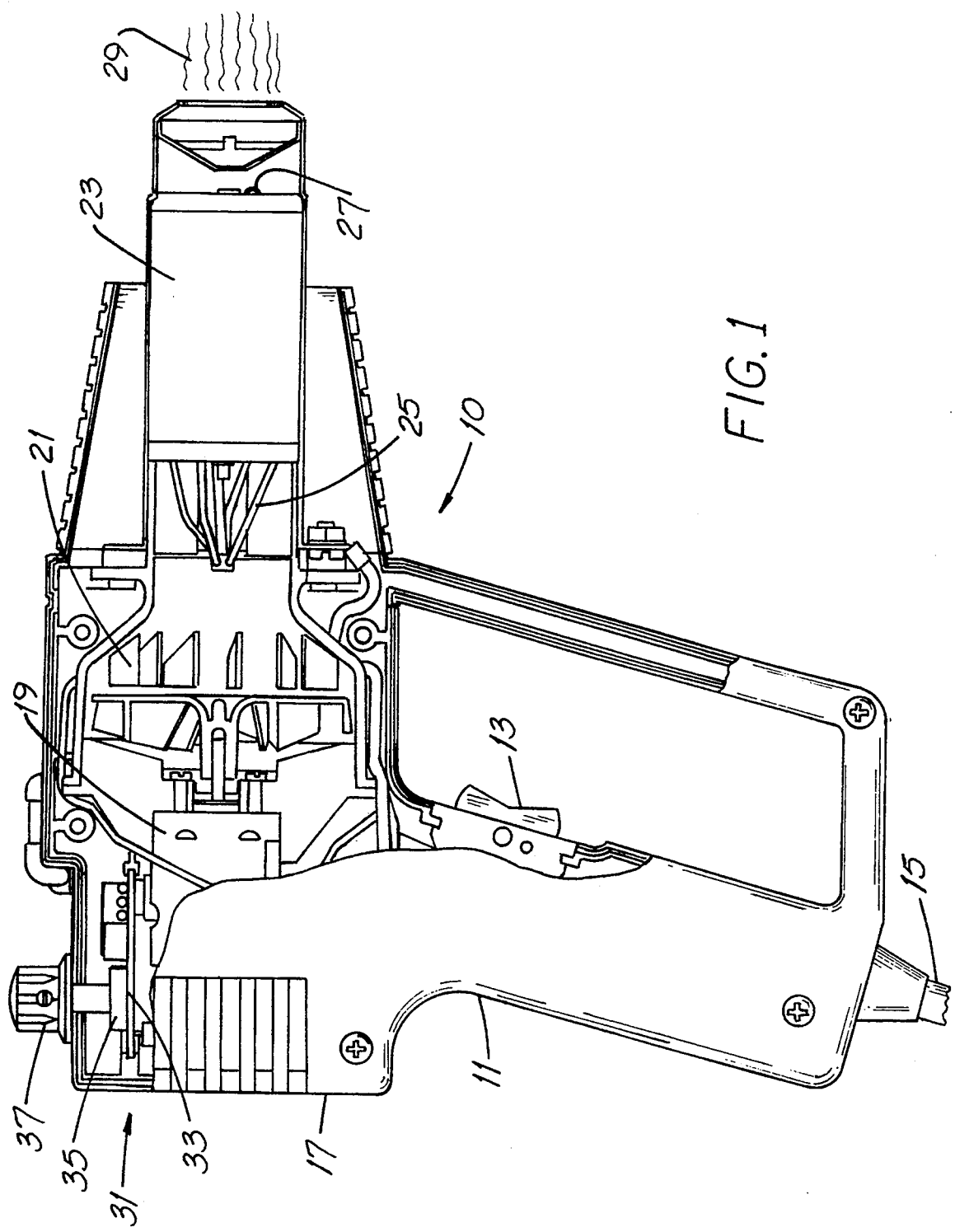
FIG. 1 is a side elevation view of a heat gun with parts broken away.
Figure 2:
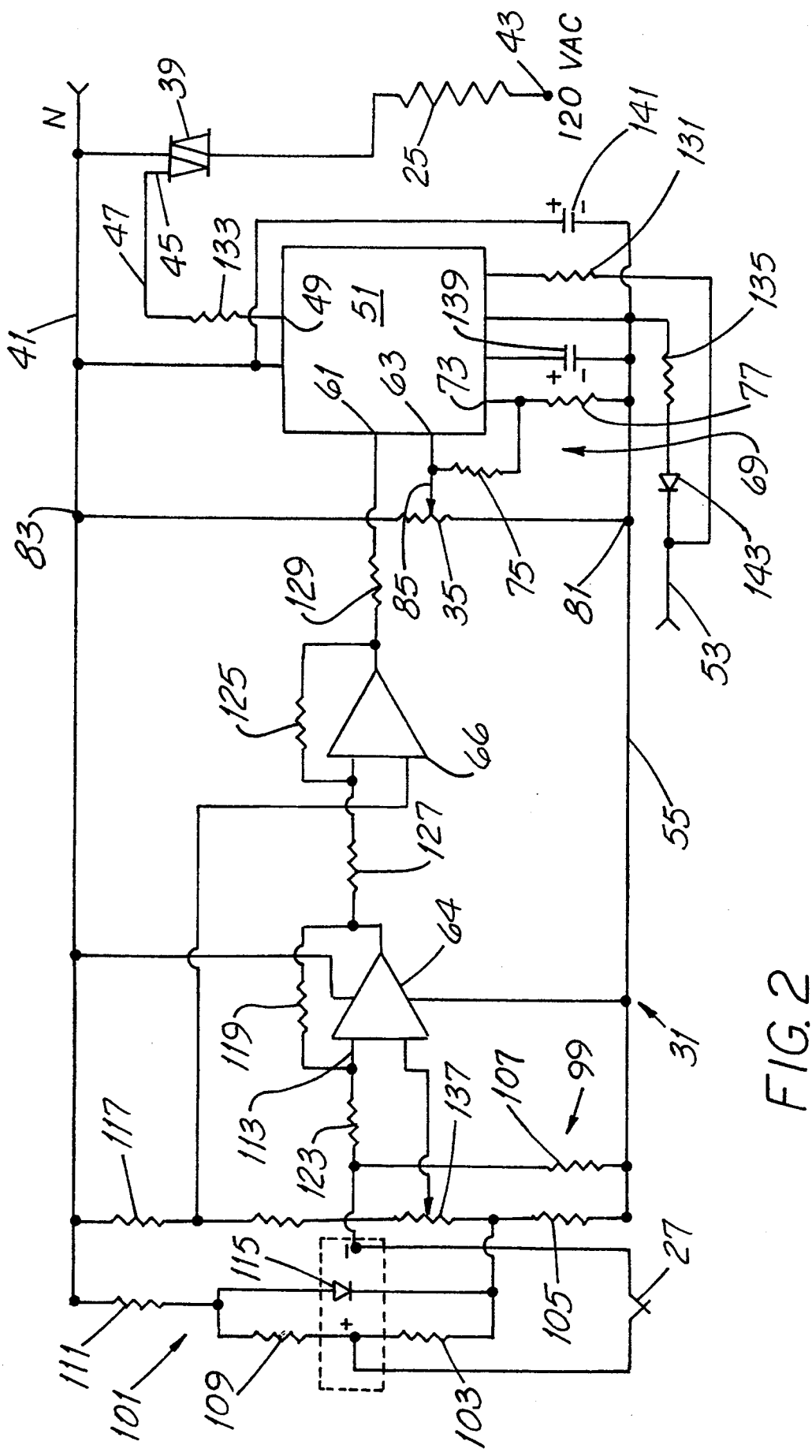
FIG. 2 is a schematic circuit diagram of the improved temperature regulator.

Referring to FIGS. 1 and 2, a heat gun 10 (a pistol-shaped device providing heated air at a regulated temperature) includes a gripping handle 11 and an on-off trigger 13. The gun 10 is plugged into a conventional 120 VAC outlet by a cord 15 and plug (not shown). The gun housing 17 contains an electric drive motor 19 powering a fan 21 forcing air through a hollow, cylindrical ceramic core 23. The core 23 includes a heating element 25 which become very hot when electrical power is applied to it and the core 23 itself (and the air passing through the core 23) is thus heated.

A thermocouple-type sensor 27 is mounted in a temperature-sensing relationship to the air stream 29 passing through the core 23. Such sensor 27 is connected to and is a part of the inventive regulator 31, other component parts of which are mounted on a printed circuit board 33 in the upper rear portion of the housing 17. The regulator 31 includes a potentiometer 35, the adjustment stem of which extends exterior of the housing 17 for attachment of a control knob 37.

The user of the gun 10 can rotate the knob 37 through an arc of about 270° to select a set point air temperature ranging from low to high. In one highly preferred embodiment, such air temperature ranges from about ambient to over 1000° Fahrenheit. To operate the gun 10, the user simply selects a desired air temperature and squeezes the trigger 13 to start the motor 19. The application of electrical power to the heating element 25 (and, therefore, the temperature of the resulting air stream 29) is thereafter controlled by the regulator 31.

Before describing details of the heat gun 10 and its new regulator 31, it will be helpful to have an understanding of how output power (e.g., power to the heating element 25) can be controlled. There are at least two basic approaches to controlling output power by controlling the 120V 60 Hz AC sine wave. One way is to "turn-on" the power for a portion (or all) of each half-cycle, i.e., each half-wave. This requires some control activity every half-cycle of the AC sine wave, i.e., every 1/120th second in a 60 Hz system.

Another approach is to "turn on" power for some portion or all of a relatively large number of "cycle units" of the AC sine wave. The latter approach is used in the inventive regulator 31. The "unit" or number of such cycles used in such regulator 31 as a basis for power control is about 20 cycles of the AC sine wave. Therefore, each "period" over which power may be turned on is about 330 milliseconds in a 60 Hz system. As described below, this period is established by a sawtooth modulating voltage which requires about 330 milliseconds for one complete sawtooth cycle.

For example, if the potentiometer temperature setting requires about 50% power to maintain the set point temperature, the regulator 31 "turns on" the thyristor 39 continuously for about the first 10 of 20 cycles of the AC sine wave by providing "gating" current pulses every one-half cycle for each of the 10 cycles. During the remaining 10 cycles of the AC sine wave, no gating pulses are provided. At the end of each 20 cycles, the sequence repeats.

Proportional control in this way, never before used in a heat gun 10 insofar as is known, has a number of technical and commercial advantages. One advantage is that it avoids switching power during an excursion of the AC power sine wave at a point where the value of such wave is other than zero. This helps avoid electrical "noise" or "hash" which can interfere with radio, TV and the like and is difficult and costly to suppress.

Another advantage is that it avoids controlling electrical power in half-cycle increments of the AC power sine wave. Controlling power in half-cycle increments often reflects a DC voltage component back into the AC supply line, a result which is prohibited by many utilities, especially in Europe.

Still another advantage is that actual air temperature is caused to change more gradually as such actual temperature approaches the desired or set point temperature. An analogy in mathematical terms is to say that the actual air temperature is made to approach the set point temperature asymptotically. This feature dramatically reduces temperature "overshoots" and "undershoots."

Other details of the heat gun 10 and its new regulator 31 will now be discussed. Referring particularly to FIG. 2, the heating element 25 and thyristor 39 are connected in series between the AC neutral bus 41 and the 120 VAC line 43. AC power to the element 25 is switched on and off by the thyristor 39 which has the usual control "gate 45."

The thyristor 39 works in the following way. A triggering current "injected" pulse-like along the lead 47 and into the gate 45 at a "zero crossing point" of an AC half cycle causes the thyristor 39 to conduct during the immediately following half cycle. When the AC wave again goes through zero (in the opposite direction), the thyristor 39 turns off and stays off unless and until another pulse current is injected into the gate 45 at that next zero crossing. While the gate current can be positive or negative, a negative current gives slightly better sensitivity and is used in the invention. Gating current is from the pin of an integrated circuit integrated circuit (IC) 51.

Figure 4:
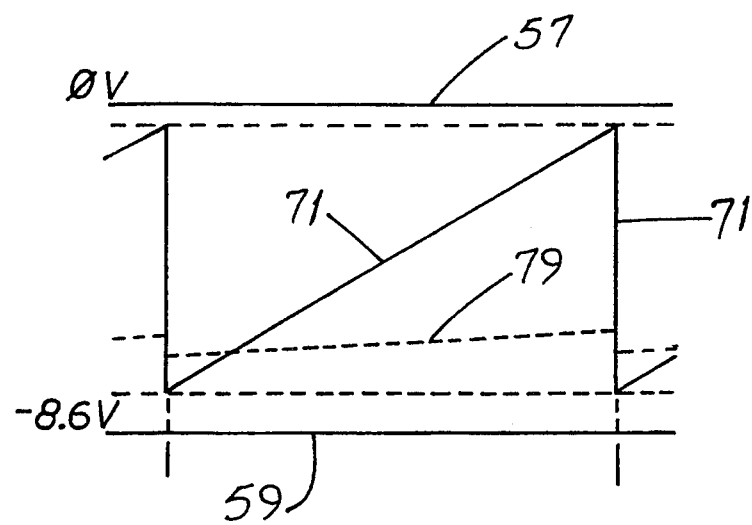
FIG. 4 is a graphic representation of sawtooth voltages and ranges.
Figure 3:
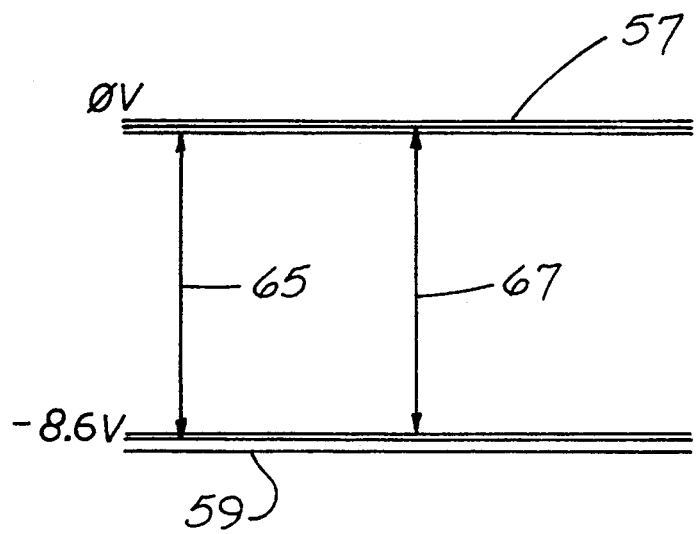
FIG. 3 is a graphic representation of voltage values and ranges.

Continuing with the description of other details of the regulator 31 and its operation, the lead 53 is connected between an auxiliary heater winding (not shown) and the motor and is at a voltage of about 20 VAC. The IC 51 maintains the voltage between the neutral rail or bus 41 and the negative-potential or "hot" bus 55 at about −8.6 VDC. That is, the potential of the bus 55 is −8.6 VDC and that of the neutral bus 41 about zero. Referring to FIGS. 3 and 4, the potential of the neutral bus 41 is represented by the line 57 and the potential of the negative bus 55 is represented by the line 59.

The IC 51 has an input pin 61 and a modulated pin 63. Pin 61 receives a signal through first and second input amplifiers 64 and 66, respectively. The range of voltage on the pin 61 (such voltage representing an actual air temperature) is represented by the arrow 65 while the range of voltage on the pin 63 (such voltage representing the set point temperature) is represented by the arrow 67. A close inspection of FIG. 3 shows that the voltage on the pin 61 can approach the line 59 somewhat more closely than can the voltage on the pin 63. Conversely, the voltage on the pin 63 can approach the line 57 somewhat more closely than can the voltage on the pin 61.

The polarity of the pins 61 and 63 relative to one another is that parameter which controls whether pin 49 provides a gating current to the thyristor 39. If the input voltage to pin 61 is positive with respect to that at pin 63 (that is, pin 61 is somewhat less negative than pin 63), a current is provided at pin 49 and the thyristor 39 conducts. On the other hand, if the voltage to pin 63 is positive with respect to that to pin 61 (that is, pin 63 is somewhat less negative than pin 61), pin 49 does not provide a gating current and the thyristor 39 does not conduct.

Specific examples (using arbitrarily-selected values) will help illustrate this point. If the voltage on pin 61 is −2.6V and that on pin 63 is −4.1V, pin 61 is said to be at a positive polarity with respect to pin 63 and the thyristor 39 is caused to conduct. On the other hand, if the voltage on pin 63 is −3.1V and that on pin 61 is −4.8V, pin 63 is said to be at a positive polarity with respect to pin 61, no gating current is provided at pin 49 and the thyristor 39 does not conduct.

The regulator 31 has a sawtooth voltage generator 69 and a portion of such sawtooth voltage is applied to pin 63. "Apportioning" of sawtooth voltage will be better understood by reference to FIG. 4 which shows in a solid-line trace 71 the sawtooth voltage provided by the IC 51 at pin 73. The excursion of such voltage is nearly from line 57 to line 59. By using voltage-dividing resistors 75,77, only a portion of the sawtooth voltage (as represented by the dashed trace 79) is applied to pin 63. The fixed terminals 81, 83 of the temperature-selecting potentiometer 35 are respectively connected between "circuit negative" bus 55 (which is maintained at about −8.6 volts) and the circuit "neutral bus" 41. However, the slider or adjustment terminal 85 of the potentiometer 35 is connected to pin 63 of the IC 51 so that a portion of the sawtooth voltage and the potentiometer slider voltage are both applied to pin 63. The importance of this fact will become apparent.

The following part of this discussion (which can be a bit confusing unless considered carefully) explains how the relative polarities of the pins 61 and 63 are controlled to effect temperature regulation. When the slider 85 is in the lowest or "cool" setting (at an upward position as viewed in FIG. 2) and when the heater element 25 is cool, the voltages at pins 61 and 63 are both negative but that at pin 63 will be less negative than that at pin 61. Considering FIG. 3, the voltage at pin 63 is then closer to the zero potential line 57 than is the voltage at pin 61. Per the "rules" stated above, the thyristor 39 does not then conduct at all, the heater element 25 is not energized and the air from the gun 10 stays at about ambient temperature.

As the potentiometer slider 85 is advanced toward a warmer air temperature (moved downward as viewed in FIG. 2), the value of the negative voltage on pin 63 declines toward −8.6V and at the same time the sawtooth voltage becomes more substantial and therefore more able to modulate that at pin 63. At any instant, the magnitude of the "net" negative voltage on pin 63 is the algebraic sum of the "gross" pin 63 voltage and the sawtooth voltage.

At the tips of the sawtooth voltage "trace" (where such voltage is of the greatest negative magnitude), such voltage depresses the value of the net voltage on pin 63. Or, to fit that condition into "rules" stated above, pin 61 becomes positive with respect to pin 63 during those very short increments of time during which the sawtooth voltage is at or near its maximum negative value. As a consequence, pin 49 of the IC 51 gates the thyristor 39 to conduct over those very short increments of time and the temperature of the heater element 25 (and, thus, air temperature) rises.

As the potentiometer slider 85 is moved toward higher air temperature settings, the negative voltage produced by it at pin 63 continues to decline toward −8.6V. As the potentiometer-produced voltage at pin 63 declines, the modulating sawtooth voltage is able to depress the gross pin 63 voltage below that at pin 61 for an increasing percentage of elapsed time. The heater element 25 is therefore "on" for an increasing percentage of time.

These principles are generally illustrated by the representations of FIGS. 5-7. FIG. 5 illustrates what occurs as the actual air temperature, represented by the voltage at pin 61 (and then being lower than the set point temperature), approaches the set point temperature represented by the voltage on pin 63. The upper tips 87 of the sawtooth voltage 89 "drive" the voltage at pin 63 to a value which is positive with respect to that at pin 61 (i.e., "less negative" than that at pin 61) for only a small percentage e.g., 5% of each 20 cycles of the AC sine wave 91. As a result, the heater element 25 is on for about 95% of the time.

As represented by FIG. 6, the actual air temperature is about equal to the set point temperature. Under such condition, the sawtooth voltage 89 drives the voltage on pin 63 to a value which is positive with respect to that at pin 61 for about 10 of each 20 cycles of the AC sine wave 91. The heater element 25 is on about 50% of the time at this steady state condition which will persist so long as the trigger 13 is squeezed on, air flows freely through the core 15 and the potentiometer setting is unchanged.

FIG. 7 represents how control occurs if the actual air temperature is above the set point temperature as may be the case if the user decided to change the set point to a lower value. The sawtooth voltage 89 drives the voltage on pin 63 to a value which is positive with respect to that at pin 61 for about 18-19 of each 20 cycles of the AC sine wave 91. The heater element 25 is then on for only about 5-10% of the time. But as the actual air temperature declines toward the set point, the element 25 is turned on for an increasing percentage of time and "settles out" at about 50% "on time" when the actual air temperature again becomes equal to the set point.

In FIGS. 5-7, the time span between tips 87 and is about 330 milli-seconds in a highly preferred embodiment. Similarly, the same time span is represented by the distance between lines 93 and 95 and is that time required for the AC sine wave 91 to undergo 20 cycles in a 60 Hz system. The rectangular envelopes 97 represent the time over which AC power is applied to the heater element 25.

The amplitude and period of the sawtooth voltage 89 are selected in view of the time constant of the air heating system including the core 15, the heating element 25 and the gun structure nearby. As the circuit is arranged, the amplitude of the sawtooth voltage 89 is quite low when the potentiometer 35 is at or near its low or high setting and is at its normal modulating amplitude between such settings.

This brings the description to one of the major benefits of the new regulator 31. Such benefit is better appreciated by understanding some aspects of conventional regulators. Typically, the potentiometer 35 is used to adjust the gain of an amplifier used in the circuit. (If referred to the inventive circuit, the potentiometer 35 would be used to adjust the gain of the second input amplifier 66.) Therefore, the potentiometers used in a conventional heat gun must have values that are close to identical in order to achieve consistent performance gun-to-gun. Such potentiometers are relatively expensive. And even disregarding cost, a small change in adjusted resistance produces a relatively large change in the percentage of time the heater element is on or off.

In the inventive regulator 31, the potentiometer 35 is connected to the IC 51, not to an amplifier 64, 66. And the change in the potentiometer-produced voltage on pin 63 is not a function of the value of the change in potentiometer resistance. Rather, it is generally a function of the percent change, whatever the potentiometer resistance may be (within reasonable limits). Translated into cost-related terms, the potentiometers 35 used to make the regulator 31 can have "sloppy" tolerances one to another (e.g., 20%) and, therefore, be of significantly lower cost while yet providing consistent gun-to-gun performance.

But that is not all. A second major benefit relates to the way in which the circuit protects against an open thermocouple temperature sensor 27. In certain known conventional circuits, an open thermocouple "looks like" a demand for a higher air temperature and the heater coil is turned full on to meet this falsely-indicated demand.

In the inventive regulator, there are two "subcircuits" 99, 101 having generally-equal currents flowing in opposite directions. The first subcircuit 99 includes resistors 103, 105 and 107 which form a "load" across the voltage generating thermocouple 27. Thus, a small current flows through these resistors in one direction. Resistors 109, 111 and 107 (along with the thermocouple 27) form a connection between the neutral bus 41 and the −8.6V negative hot bus 55. This causes a small, essentially equal current to flow through resistor 107 in the opposite direction. Resistor 107 is the only component common to both circuits 99, 101 and, therefore, in that resistor 107, the currents essentially cancel one another.

However, if the thermocouple 27 breaks and becomes an "open" circuit, resistor 107 has the effect of driving the pin 113 of the input amplifier 64 to a voltage value such that, to pin 61 of the IC 51, the output voltage of the amplifier 66 "looks like" a high air temperature value. The effect is to turn off power applied to the heater element 25. Thus, the gun 10 fails to a turned-off stated in event of a broken thermocouple 27.

The new regulator 31 offers yet another advantage. As it is heated, the thermocouple 27 (which is made of two joined wires) develops a hot junction voltage which is that voltage (which changes with air temperature) used to control the heating element 25. The thermocouple wires are attached to copper ribbons on the printed circuit board 33 and form cold junctions which also produce voltages. The cold junction voltages tend to undesirably subtract from the hot junction voltage.

To counteract this, the regulator 31 includes a diode 115 which develops a temperature-dependent voltage of its own. This diode-produced voltage essentially negates the "substraction effect" of the cold junction voltages. To help assure proper cancellation, the printed circuit board 33 and the components on the board 33 are located in the upper rear portion of the gun housing 17 so that all parts of the board 33 are at about the same temperature.

The following components have been found useful in making an embodiment of the heat gun 10 and its new regulator 31:

| DESIG. | DESCRIPTION |
| --- | --- |
| R111 | 12k OHM |
| R109 | 4.3k OHM |
| R103 | 100 OHM |
| R105 | 1.5k OHM |
| R117, R119 | 220k OHM |
| R121, R75 | 16k OHM |
| R123 | 10k OHM |
| R125 | 1M OHM |
| R107, R127, R129 R131 | 100k OHM |
| R77 | 36k OHM |
| R133 | 12 OHM |
| R135 | 1k OHM |
| R137 | 1k OHM Trimmer |
| R35 | 100k OHM Temp. Adj. |
| C139 | 0.47 mF 35 V Tantalum Capacitor |
| C141 | 220 mF 16 V Electrolytic Capacitor |
| D115 | 1N4148 Diode |
| D143 | 1N4001 Diode |
| A64, A66 | LM358N Dual OP-AMP |
| IC51 | UAA1016B |
| Q39 | Thyristor |

While the principles of this invention have been described in connection with specific embodiments, it should be understood clearly that these descriptions are made only by way of example and are not intended to limit the scope of the invention.

I claim:

1. In a gun-like device emitting heated air at a variable temperature selected by the user and having a temperature regulator including (a) an amplifier, (b) a thyristor for controlling electrical power to a heater assembly and (c) a variable resistor for selecting an air temperature to be maintained by the regulator, the improvement wherein:

the regulator includes an integrated circuit emitting gating pulses controlling the thyristor;
the amplifier is a constant gain reference amplifier;
the variable resistor is a three-terminal potentiometer having a pair of fixed terminals and an adjustment terminal having a control voltage thereon, the adjustment terminal being connected to the integrated circuit;
the fixed terminals are connected between a neutral bus and a voltage bus having a substantially constant voltage therebetween;
the integrated circuit has a voltage-modulated pin;
the adjustment terminal is connected to the voltage-modulated pin, thereby applying the control voltage to the pin; and
the control voltage is a function of the percentage of the potentiometer resistance connected between the voltage bus and the pin.

2. The device of claim 1 wherein the regulator includes a generator providing a sawtooth voltage, the generator is connected to the voltage-modulated pin and the net voltage at the pin is the algebraic sum of the sawtooth voltage and the potentiometer-derived voltage.

3. The device of claim 2 wherein the integrated circuit includes a reference pin at a reference voltage and the integrated circuit emits gating pulses when the net voltage at the modulated pin is negative with respect to the reference voltage.

4. The device of claim 3 wherein the reference voltage represents the actual temperature of air emitted by the device and varies with such temperature.

5. The device of claim 4 wherein the device includes an air heating assembly having a time constant and the sawtooth voltage has a period selected in view of the time constant.

6. The device of claim 5 wherein the period of the sawtooth voltage is in the range of 200 milliseconds to 400 milliseconds.

7. The device of claim 6 wherein the period of the sawtooth voltage is in the range of about 300 milliseconds to about 350 milliseconds.

8. The device of claim 1 including a thermocouple in a temperature-sensing relationship to air emitted by the device and the regulator includes:

first and second subcircuits having a common sensing resistor;
each subcircuit has a current flowing therethrough, the resistor has both currents flowing therethrough and the currents flow in opposite directions through the resistor and are of substantially equal value; and,
one of the subcircuits includes the thermocouple, whereby an open thermocouple produces a current imbalance in the resistor.

9. The device of claim 8 wherein:

the regulator includes an input amplifier providing a signal representing air temperature;
the sensing resistor is connected to the input amplifier;
the current imbalance produces a voltage across the sensing resistor and the input amplifier thereby provides a signal representing a high air temperature.

10. The device of claim 9 wherein:

the regulator includes a reference amplifier connected to the integrated circuit; and,
the high air temperature signal provided by the input amplifier biases the reference amplifier and prevents the integrated circuit from emitting gating pulses, whereby the heater assembly is maintained in an "off" state.

11. The device of claim 1 wherein the regulator includes:

a thermocouple in temperature-sensing relationship to emitted air and providing a hot junction voltage at a polarity and representing actual air temperature;
a diode providing a temperature-dependent voltage; and wherein:
the thermocouple is attached to a circuit board by at least one electrical connection providing a cold junction voltage at a polarity opposite the polarity of the hot junction voltage; and,
the diode substantially negates the cold junction voltage.

12. The device of claim 11 wherein the diode and the electrical connection are maintained at substantially the same temperature.

13. The device of claim 12 wherein the diode and the electrical connection are on the printed circuit board.

* * * * *